US009245392B2

(12) United States Patent
Yang et al.

(10) Patent No.: US 9,245,392 B2
(45) Date of Patent: Jan. 26, 2016

(54) INSPECTION SYSTEM FOR VEHICLE AND CONTROL METHOD THEREOF

(71) Applicant: Hyundai Motor Company, Seoul (KR)

(72) Inventors: Chang Mo Yang, Cheonan-si (KR); Dong Myong Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 22 days.

(21) Appl. No.: 14/327,296

(22) Filed: Jul. 9, 2014

(65) Prior Publication Data

US 2015/0161826 A1 Jun. 11, 2015

(30) Foreign Application Priority Data

Dec. 5, 2013 (KR) ........................ 10-2013-0150689

(51) Int. Cl.
*G06F 11/22* (2006.01)
*G07C 5/00* (2006.01)
*G07C 5/08* (2006.01)

(52) U.S. Cl.
CPC .............. *G07C 5/008* (2013.01); *G07C 5/0841* (2013.01)

(58) Field of Classification Search
CPC .............................. G07C 5/008; G07C 5/0841
See application file for complete search history.

(56) References Cited

U.S. PATENT DOCUMENTS 6,529,808 B1 * 3/2003 Diem ................... G01R 31/006 701/31.5
8,666,588 B2 * 3/2014 Geilen ................. G07C 5/0816 701/29.1
8,788,141 B2 * 7/2014 Isaacs .................... G06Q 10/06 701/29.1
9,103,743 B2 * 8/2015 Couch ................... G01M 17/00
2004/0134979 A1 * 7/2004 Kudo ..................... G06K 1/126 235/376
2005/0171683 A1 * 8/2005 Irie .......................... G08G 1/20 701/117
2007/0266782 A1 * 11/2007 Bartz ................... G06Q 10/087 73/156
2007/0296559 A1 * 12/2007 Fehr .................... H04M 1/6091 340/426.2
2007/0296961 A1 * 12/2007 Sekine ................ G01M 11/067 356/213
2008/0166039 A1 * 7/2008 Tateyama ............... H05K 13/08 382/150
2009/0299900 A1 * 12/2009 Chen .................... G06Q 20/102 705/40
2011/0133899 A1 * 6/2011 Shachar ............... G05B 19/128 340/10.1
2013/0158777 A1 * 6/2013 Brauer .................. G06Q 10/20 701/31.4
2015/0228131 A1 * 8/2015 Hayashi .................. B60R 16/02 701/29.1

FOREIGN PATENT DOCUMENTS

| | | | |
|---|---|---|---|
| JP | 4218575 | B2 | 11/2008 |
| JP | 4363240 | B2 | 8/2009 |
| KR | 10-2007-0040888 | A | 4/2007 |
| KR | 10-1247465 | B1 | 3/2013 |
| KR | 10-1294088 | B1 | 8/2013 |

* cited by examiner

*Primary Examiner* — Calvin Cheung
(74) *Attorney, Agent, or Firm* — Morgan, Lewis & Bockius LLP

(57) ABSTRACT

An inspection system for a vehicle and a method thereof to inspect whether various electronic components mounted inside a completed vehicle may be normally operated, may include a wireless on-board diagnostics device (OBD) which may be mounted in the vehicle entering an inspection process, a plurality of inspection computers, which wirelessly communicates with the wireless OBD, and may be provided for each corresponding inspection step, and a barcode reader which may be provided in the inspection computers, recognizes a barcode of the vehicle, transmits a vehicle information about the vehicle, on which the inspection may be performed, to the inspection computers.

11 Claims, 2 Drawing Sheets

1

1

INSPECTION SYSTEM FOR VEHICLE AND CONTROL METHOD THEREOF

CROSS-REFERENCE TO RELATED APPLICATION

The present application claims priority to and the benefit of Korean Patent Application No. 10-2013-0150689 filed on Dec. 5, 2013, the entire contents of which is incorporated herein for all purposes by this reference.

BACKGROUND OF THE INVENTION

1. Field of the Invention

The present invention relates to an inspection system for a vehicle, and a control method thereof, and more particularly, to an inspection system for a vehicle, which can continuously and automatically inspect whether various electronic components mounted inside a completed vehicle are operated without stopping for an inspection process through wireless communication, and a control method thereof.

2. Description of Related Art

Recently, various sensors and electronic components, such as an air conditioning system and an AV system, for checking an engine state, a traveling state, an acceleration state, and the like, and promoting convenience for a driver or a passenger are mounted in a vehicle, and have been continuously increased.

The electronic components serve as significant factors for promoting user convenience and checking a state of a vehicle, and whether various electronic components mounted in an assembly-completed vehicle are not operated or are erroneously operated needs to be essentially inspected.

Accordingly, in order to inspect the electronic components of the assembly-completed vehicle in the related art, the vehicle is transferred to an inspection process to perform inspection work.

That is, in the related art, in an inspection process of a corresponding electronic component for each step among inspection processes divided into multiple steps in order to inspect the electronic components mounted in the assembly-completed vehicle, a worker directly connects scanner equipment and a corresponding computer to the vehicle, and inspects an operation state and whether an erroneous operation is performed, and another worker repeatedly performs the aforementioned inspection work for a next inspection process and inspects whether the electronic components are normally operated, or are operated.

However, in the inspection system in the related art, a worker needs to connect the scanner equipment to the vehicle and performs the inspection work through the corresponding computer in every inspection process for each step, so that there is a problem in that productivity is degraded due to an increase in a total inspection time.

Further, an inspection history of a corresponding vehicle needs to be managed by separately gathering an inspection result value for each inspection step, so that an inspection history management of the vehicle becomes complicated, and the worker needs to directly manually connect the scanner equipment and the corresponding computer for each step, so that cost is increased due to an increase in manpower consumption.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an inspection system for a vehicle, which automatically and continuously inspects whether various electronic components mounted inside a completed vehicle are operated without a stopping for an inspection process through wireless communication, thereby decreasing an inspection process time and improving productivity, to improve manpower consumption to decrease cost, and a control method thereof.

In an aspect of the present invention, an inspection system for a vehicle, which inspects whether various electronic components mounted inside a completed vehicle are normally operated, may include a wireless on-board diagnostics device (OBD) which is mounted in the vehicle entering an inspection process, a plurality of inspection computers, which wirelessly communicates with the wireless OBD, and is provided for each corresponding inspection step, and a barcode reader which is provided in the inspection computers, recognizes a barcode of the vehicle, transmits a vehicle information about the vehicle, on which the inspection is performed, to the inspection computers.

A separate barcode device recognizes the barcode of the vehicle, and the recognized barcode is input to the wireless OBD as a subsystem identification (SSID).

The wireless OBD transmits an inspection result of the vehicle received from each inspection step to an inspection computer provided in the corresponding inspection step.

A receiver configured to receive information transmitted from the wireless OBD is mounted in the inspection computers.

A worker directly mounts the wireless OBD to the vehicle, which may have entered the inspection process, and separates the wireless OBD from the vehicle after each inspection step is completed.

Each inspection computer matches the vehicle information received from the barcode reader and a vehicle information received from the wireless OBD, and stores an inspection record of the corresponding vehicle, on which the inspection is performed, in a corresponding inspection step.

Each inspection step is continuously performed.

In another aspect of the present invention, a method of controlling an inspection system for a vehicle, which inspects whether various electronic components mounted inside an assembly-completed vehicle are normally operated, may include (A) mounting, by a worker, a wireless on-board diagnostics device (OBD) before the vehicle enters an inspection step, recognizing a barcode of the vehicle, and determining whether a subsystem identification (SSID) of the wireless OBD is changed, (B) recognizing a vehicle information about the vehicle, which may have entered a inspection process, in a corresponding inspection step after a change in the SSID of the wireless OBD is completed, determining whether the recognized vehicle information is matched with a vehicle information received from the wireless OBD, and performing the inspection, and (C) separating, by the worker, the wireless OBD from the vehicle after a completion of each inspection step, and terminating the inspection process.

The step of (A) may include mounting, by the worker, the wireless OBD to a corresponding vehicle, recognizing the barcode of the vehicle by using a separate barcode device, and inputting the recognized barcode to the wireless OBD as an SSID, Receiving a signal output from the wireless OBD and determining whether the SSID is changed, and returning the step of inputting the SSID into the wireless OBD again when it is determined that the SSID of the wireless OBD is not changed.

The step (B) may include when it is determined that the SSID of the wireless OBD is changed through the step (A), recognizing the barcode of the vehicle, which may have entered the inspection process, with the barcode reader, and outputting the vehicle information to an inspection computer, determining whether the vehicle information about the vehicle output to the inspection computer is matched with the SSID received from the wireless OBD, when the vehicle information about the vehicle output to the inspection computer is not matched with the SSID received from the wireless OBD, returning to the step of recognizing the barcode of the vehicle, on which the inspection is to be performed, with the barcode reader, and outputting the recognized barcode to the inspection computer, and when the vehicle information about the vehicle output to the inspection computer is matched with the vehicle information received from the wireless OBD, making the vehicle enter each inspection step of the inspection process, and performing the inspection.

The step (C) may include when each inspection step of the vehicle is completed through the step (B), separating, by the worker, the wireless OBD from the vehicle, and determining inspection information about the vehicle from each inspection computer provided for each corresponding inspection step, after a completion of the separation of the wireless OBD, determining whether the vehicle is normal, transferring the vehicle, and completing a control of the inspection system.

As described above, according to the inspection system for the vehicle according to the exemplary embodiment of the present invention, and the method of controlling the same, whether various electronic components mounted inside the completed vehicle may be operated is automatically and continuously inspected without stopping for the inspection process through wireless communication, thereby decreasing an inspection process time to improve productivity, and minimizing manpower consumption to decrease cost.

Further, it is possible to integrate and manage inspection results of the respective steps of an inspection target vehicle, thereby easily managing a vehicle inspection history, and improving the quality of a completed vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
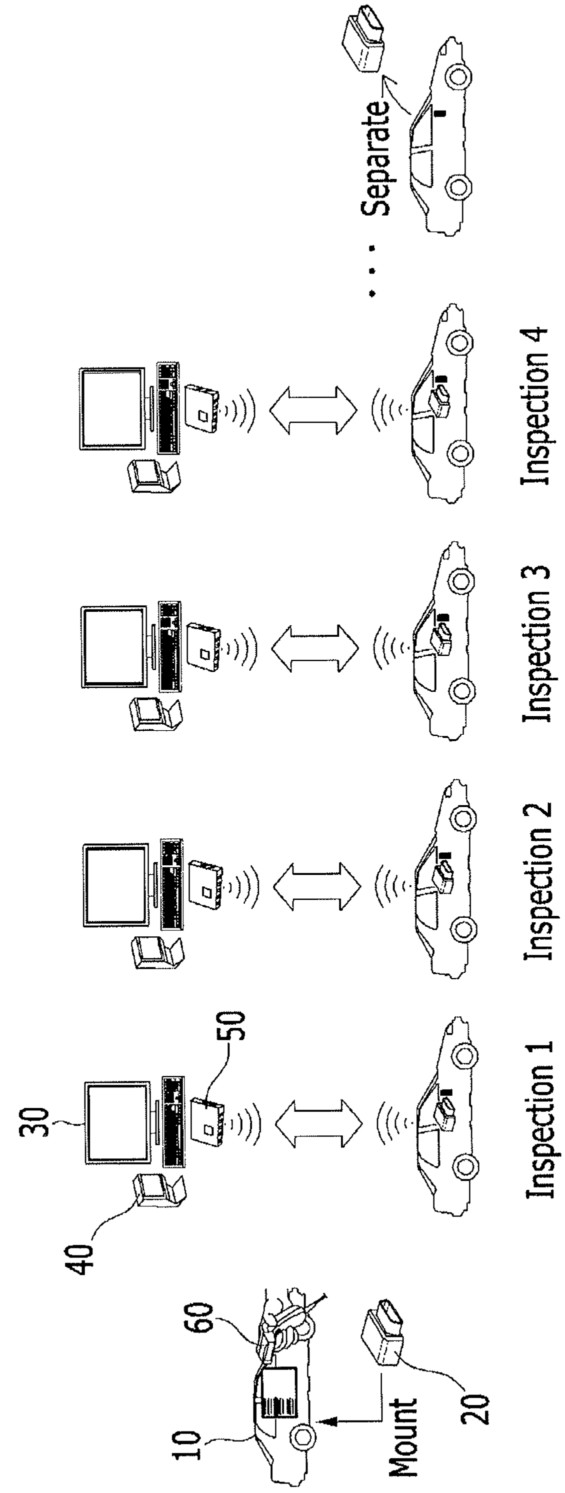
FIG. 1 is a diagram schematically illustrating a process of an inspection system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Before this, the exemplary embodiment described in the present specification and the configuration illustrated in the drawings are simply the exemplary embodiments of the present invention, and do not represent all of the technical spirits of the present invention, and thus it should be understood that there are various equivalents and modification examples substitutable with the exemplary embodiment at the time of filing the present invention.

FIG. 1 is a diagram schematically illustrating a process of an inspection system for a vehicle according to an exemplary embodiment of the present invention.

Referring to FIG. 1, whether various electronic components mounted inside a completed vehicle 10 are operated is automatically and continuously inspected without stopping for an inspection process through wireless communication, thereby decreasing an inspection process time to improve productivity, and minimizing manpower consumption to decrease cost.

To this end, as illustrated in FIG. 1, an inspection system 1 for a vehicle according to an exemplary embodiment of the present invention is to inspect whether the various electronic components mounted inside the completed vehicle 10 are normally operated, and includes a wireless OBD 20, an inspection computer 30, and a barcode reader 40.

First, the wireless OBD 20 is mounted in the vehicle 10 entering an inspection process, and a worker directly connects the wireless OBD 20 to a cable which connects scanner equipment to the vehicle 10.

Here, a separate barcode device 60 recognizes a barcode of the vehicle 10, in which the wireless OBD 20 is mounted, and the recognized barcode may be input into the wireless OBD 20 as a subsystem identification (SSID).

Further, the worker may directly mount the wireless OBD 20 in the vehicle 10, which has entered the inspection process, and may separate the wireless OBD 20 from the vehicle 10 after a completion of each inspection step.

That is, when the worker recognizes a barcode of the vehicle, in which the wireless OBD 20 is mounted, with the separate barcode device 60 and transmits the recognized barcode to the wireless OBD 20, the SSID of the mounted wireless OBD 20 is input, so that vehicle information about the corresponding vehicle 10 is output when the vehicle 10 enters the inspection process.

In the present exemplary embodiment, the plurality of inspection computers 30 is provided for each corresponding inspection step, and wirelessly communicates with the wireless OBD 20.

In the meantime, the wireless OBD 20 may transmit an inspection result of the vehicle 10 received in each inspection step to the inspection computer 30 provided in the corresponding inspection step.

Here, a receiver 50 for receiving the vehicle information and the inspection result transmitted from the wireless OBD 20 may be mounted in the inspection computer 30.

Further, the barcode reader 40 is provided in the inspection computer 30, and recognizes the barcode of the vehicle 10, and transmits the vehicle information about the vehicle 10, on which the inspection is performed, to the inspection computer 10.

The barcode reader 40 recognizes the barcode of the vehicle 10, on which the inspection is to be performed, and transmits the vehicle information to the inspection computer 30 provided in the corresponding inspection step, so that it is possible to prevent the inspection result of the vehicle 10, which waits for the inspection or on which the inspection is performed, from being erroneously input.

Here, in the corresponding inspection step, each inspection computer 30 may match the vehicle information received from the barcode reader 40 and the vehicle information received from the wireless OBD 20, and store an inspection record of the corresponding vehicle on which the inspection is performed.

Accordingly, the inspection system 1 according to the present exemplary embodiment may continuously perform the inspection steps of the electronic component, which are divided into multiple steps, and may prevent the inspection result of the corresponding vehicles 10, on which the multi-step inspection is performed, from being erroneously input, and manage the inspection results in a lump.

Hereinafter, a method of controlling the inspection system for the vehicle according to an exemplary embodiment of the present invention, which is configured as described above, will be described in detail.

Figure 2:
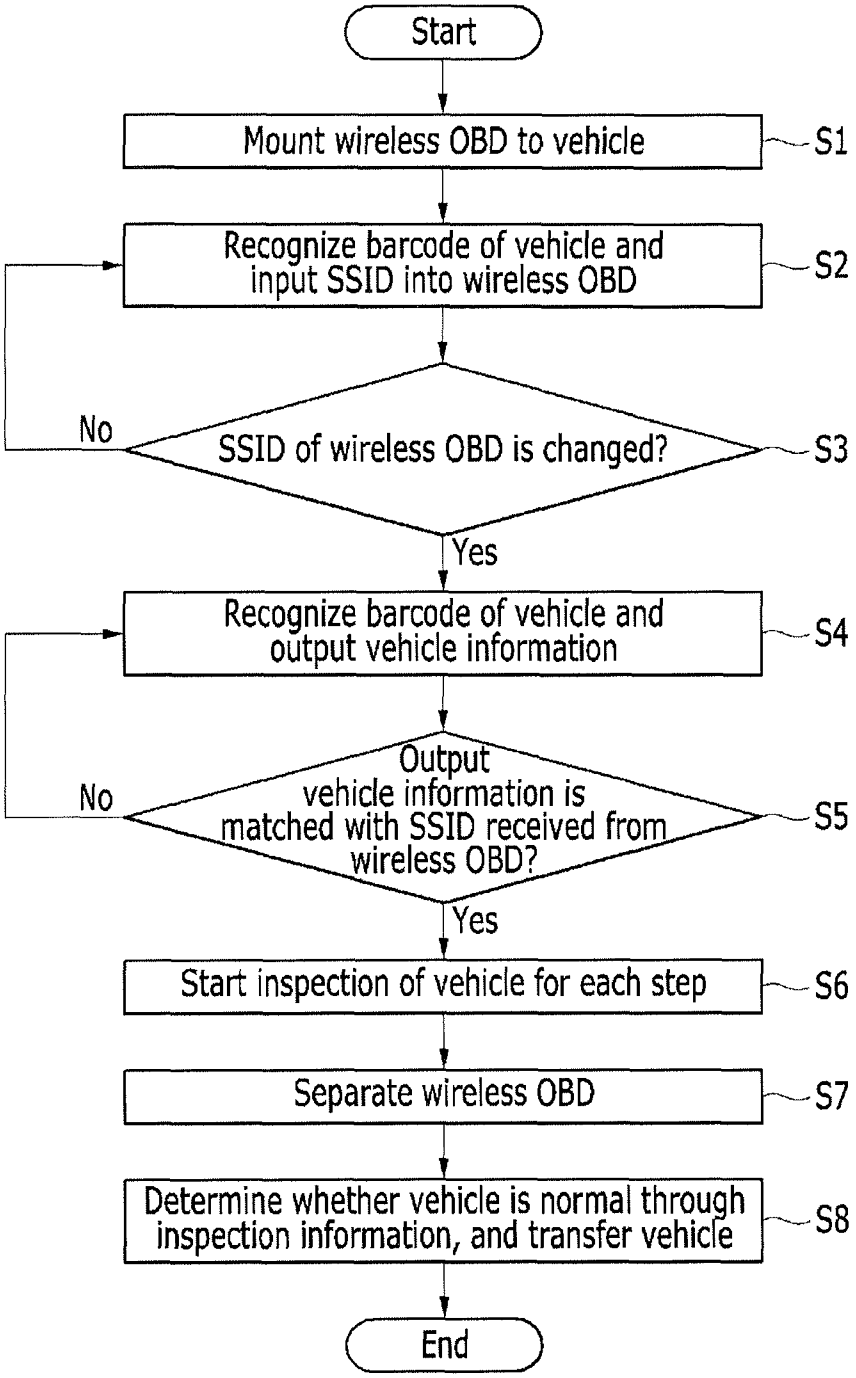
FIG. 2 is a control flow chart illustrating a method of controlling the inspection system for a vehicle according to an exemplary embodiment of the present invention.

FIG. 2 is a control flowchart illustrating a method of controlling the inspection system for the vehicle according to the exemplary embodiment of the present invention.

Referring to FIG. 2, the method of controlling the inspection system for the vehicle according to the exemplary embodiment of the present invention is to inspect whether the electronic components mounted in the assembly-completed vehicle 10 are erroneously operated, and includes (A) mounting, by a worker, the wireless OBD 20 before the vehicle 10 enters an inspection step, recognizing a barcode of the vehicle 10, and determining whether an SSID of the wireless OBD 20 is changed, (B) recognizing vehicle information about the vehicle 10, which has entered the inspection process, in a corresponding inspection step after a change in the SSID of the wireless OBD 20 is completed, determining whether the recognized vehicle information is matched with vehicle information received from the wireless OBD 20, and performing the inspection, and (C) detaching, by the worker, the wireless OBD 20 from the vehicle 10 after a completion of each inspection step, and terminating the inspection process.

First, the worker directly mounts the wireless OBD 20 to a cable, to which the scanner equipment is mounted, in the corresponding vehicle (S1), and recognizes a barcode of the vehicle by using the separate barcode device 60, and inputs the recognized barcode into the wireless OBD 20 as an SSID (S2).

Then, whether the SSID is changed is determined by receiving a signal output from the wireless OBD 20 (S3).

When it is determined that the SSID of the wireless OBD 20 is not changed (that is, a condition is not satisfied) in step S3, the process returns to step S2 of inputting the SSID to the wireless OBD 20.

In the meantime, when it is determined that the SSID of the wireless OBD 20 is changed (that is, a condition is satisfied) in step S3, the barcode of the vehicle 10, which has entered an inspection process, is recognized by the barcode reader 40, and the vehicle information is output to the inspection computer 30 (S4), and whether the vehicle information about the vehicle output to the inspection computer 30 is matched with the SSID received from the wireless OBD 20 is determined (S5).

Here, when the vehicle information about the vehicle output to the inspection computer 30 is not matched with the SSID received from the wireless OBD 20 (that is, a condition is not satisfied), the process returns to step S4 of recognizing the barcode of the vehicle, on which the inspection is to be performed, with the barcode reader 40, and outputting the recognized barcode to the inspection computer.

In the meantime, when the vehicle information about the vehicle output to the inspection computer 30 is matched with the vehicle information received from the wireless OBD 20, the vehicle 10 is made to enter each inspection step of the inspection process to perform the inspection (S6).

When each inspection step of the vehicle 10 is completed by performing the aforementioned steps, the worker separates the wireless OBD 20 from the vehicle 10 (S7), and whether the vehicle 10 is normal is determined by determining inspection information about the vehicle 10 from each inspection computer 30 after a completion of the separation of the wireless OBD 20, and then the vehicle is transferred, and then the control is completed (S8).

That is, the method of controlling the inspection system for the vehicle according to the exemplary embodiment of the present invention continuously inspects the assembly-completed vehicle 10 while repeatedly performing the aforementioned steps.

Accordingly, according to the inspection system 1 for the vehicle according to the exemplary embodiment of the present invention, which is configured as described above, and the method of controlling the same, whether various electronic components mounted inside the completed vehicle 1 is operated is automatically and continuously inspected without stopping for the inspection process through wireless communication, thereby decreasing an inspection process time to improve productivity, and minimizing manpower consumption to decrease cost.

Further, it is possible to integrate and manage inspection results of the respective steps of the inspection target vehicle 10, thereby easily managing a vehicle inspection history, and improving the quality of a completed vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. An inspection system for a vehicle, which inspects whether various electronic components mounted inside a completed vehicle are normally operated, the inspection system comprising:

a wireless on-board diagnostics device (OBD) which is mounted in the vehicle entering an inspection process;

a plurality of inspection computers, which wirelessly communicates with the wireless OBD, and is provided for each corresponding inspection step; and a barcode reader which is provided in the inspection computers, recognizes a barcode of the vehicle, and transmits a vehicle information about the vehicle, on which the inspection is performed, to the inspection computers.

2. The inspection system of claim 1, wherein a separate barcode device recognizes the barcode of the vehicle, and the recognized barcode is input to the wireless OBD as a subsystem identification (SSID).

3. The inspection system of claim 1, wherein the wireless OBD transmits an inspection result of the vehicle received from each inspection step to an inspection computer provided in the corresponding inspection step.

4. The inspection system of claim 1, wherein a receiver configured to receive information transmitted from the wireless OBD is mounted in the inspection computers.

5. The inspection system of claim 1, wherein a worker directly mounts the wireless OBD to the vehicle, which has entered the inspection process, and separates the wireless OBD from the vehicle after each inspection step is completed.

6. The inspection system of claim 5, wherein each inspection computer matches the vehicle information received from the barcode reader and a vehicle information received from the wireless OBD, and stores an inspection record of the corresponding vehicle, on which the inspection is performed, in a corresponding inspection step.

7. The inspection system of claim 1, wherein each inspection step is continuously performed.

8. A method of controlling an inspection system for a vehicle, which inspects whether various electronic components mounted inside an assembly-completed vehicle are normally operated, the method comprising:

mounting, by a worker, a wireless on-board diagnostics device (OBD) before the vehicle enters an inspection step;

recognizing a barcode of the vehicle;

determining whether a subsystem identification (SSID) of the wireless OBD is changed;

recognizing a vehicle information about the vehicle, which has entered an inspection process, in a corresponding inspection step after a change in the SSID of the wireless OBD is completed;

determining whether the recognized vehicle information is matched with a vehicle information received from the wireless OBD;

performing the inspection;

separating, by the worker, the wireless OBD from the vehicle after a completion of each inspection step; and terminating the inspection process.

9. The method of claim 8, wherein the method further includes:

mounting, by the worker, the wireless OBD to a corresponding vehicle;

recognizing the barcode of the vehicle by using a separate barcode device;

inputting the recognized barcode to the wireless OBD as an SSID;

receiving a signal output from the wireless OBD;

determining whether the SSID is changed; and returning the step of inputting the SSID into the wireless OBD again when it is determined that the SSID of the wireless OBD is not changed.

10. The method of claim 8, wherein the method further includes:

determining that the SSID of the wireless OBD is changed;

recognizing the barcode of the vehicle, which has entered the inspection process, with the barcode reader, and outputting the vehicle information to an inspection computer;

determining whether the vehicle information about the vehicle output to the inspection computer is matched with the SSID received from the wireless OBD;

when the vehicle information about the vehicle output to the inspection computer is not matched with the SSID received from the wireless OBD, returning to the step of recognizing the barcode of the vehicle, on which the inspection is to be performed, with the barcode reader, and outputting the recognized barcode to the inspection computer; and when the vehicle information about the vehicle output to the inspection computer is matched with the vehicle information received from the wireless OBD, making the vehicle enter each inspection step of the inspection process, and performing the inspection.

11. The method of claim 8, wherein the method further includes:

upon completing each inspection step of the vehicle separating, by the worker, the wireless OBD from the vehicle;

determining inspection information about the vehicle from each inspection computer provided for each corresponding inspection step;

after a completion of the separation of the wireless OBD, determining whether the vehicle is normal;

transferring the vehicle; and completing a control of the inspection system.

* * * * *